(12) United States Patent
Philippe

(10) Patent No.: US 8,651,352 B2
(45) Date of Patent: Feb. 18, 2014

(54) HOLSTER FOR A PORTABLE COMMUNICATION DEVICE

(75) Inventor: Geoffrey Martin Philippe, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 445 days.

(21) Appl. No.: 12/789,890

(22) Filed: May 28, 2010

(65) Prior Publication Data

US 2011/0290841 A1    Dec. 1, 2011

(51) Int. Cl.
*A45F 5/00*        (2006.01)

(52) U.S. Cl.
USPC .......................... 224/576; 224/666; 224/930

(58) Field of Classification Search
USPC ......... 224/576, 666, 930, 233, 918, 919, 908, 224/246; 320/114; 455/575.8, 575.1, 575.4, 455/575.3; 379/433.13, 433.11; 15/210.1, 15/104.92, 21.1, 34, 97.1, 88.4, 160, 15/244.1; 401/219; 206/315.9, 320; 473/408, 406; D3/218, 269; D14/250; 242/350, 446, 486.9
See application file for complete search history.

(56) References Cited

U.S. PATENT DOCUMENTS

| 4,654,917 | A | * | 4/1987 | Yeung ............................. 15/97.1 |
| 4,701,968 | A |   | 10/1987 | Stolzman |
| D366,737 | S | * | 1/1996 | Chen .............................. D32/35 |
| 5,584,089 | A | * | 12/1996 | Huang ............................ 15/97.1 |
| 5,862,117 | A | * | 1/1999 | Fuentes et al. ................ 369/100 |
| 5,900,069 | A |   | 5/1999 | Llerna |
| 6,470,574 | B1 | * | 10/2002 | Strumke, Jr. .................... 30/169 |
| 6,590,847 | B2 | * | 7/2003 | Weng ............................... 369/72 |
| 6,717,900 | B2 | * | 4/2004 | Weng ............................... 369/72 |
| 6,923,313 | B1 |   | 8/2005 | Orogun-Thomas |
| 2001/0005347 | A1 | * | 6/2001 | Kwang ............................ 369/72 |
| 2002/0129455 | A1 | * | 9/2002 | Wei ................................. 15/102 |
| 2004/0166910 | A1 |   | 8/2004 | Ha et al. |
| 2007/0090795 | A1 |   | 4/2007 | Eswaraiah |
| 2007/0287515 | A1 |   | 12/2007 | Fagrenius et al. |
| 2009/0194444 | A1 | * | 8/2009 | Jones ............................. 206/320 |
| 2010/0012536 | A1 | * | 1/2010 | Winsche .................... 206/316.2 |

FOREIGN PATENT DOCUMENTS

| JP | 2004 364 066 A | 12/2004 |
| JP | 2005-204140 A | 7/2005 |

OTHER PUBLICATIONS

European extended search report for corresponding EP application dated Jul. 28, 2010.
Canadian Examination Report dated Jan. 3, 2013 from corresponding Canadian application No. 2,741,323.

* cited by examiner

*Primary Examiner* — Nathan J Newhouse
*Assistant Examiner* — Matthew Theis
(74) *Attorney, Agent, or Firm* — Gowling Lafleur Henderson LLP

(57) ABSTRACT

A holster for a portable device is described. The holster includes a cleaning mechanism for cleaning a surface of a portable device while it is in the holster. The cleaning mechanism comprises a cleaning head movably coupled to a housing of the holster and positioned adjacent an interior surface of the holster; and an actuator coupled to the cleaning head and positioned on an exterior portion of the holster. Movement of the actuator moves the cleaning head, cleaning a portion of a surface of the portable device.

17 Claims, 4 Drawing Sheets

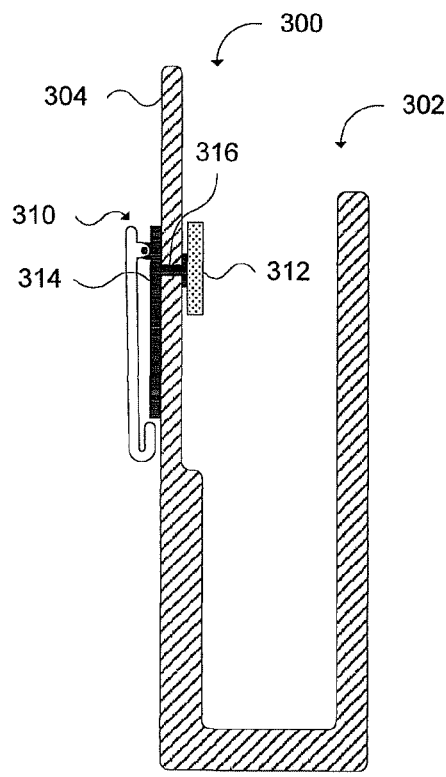
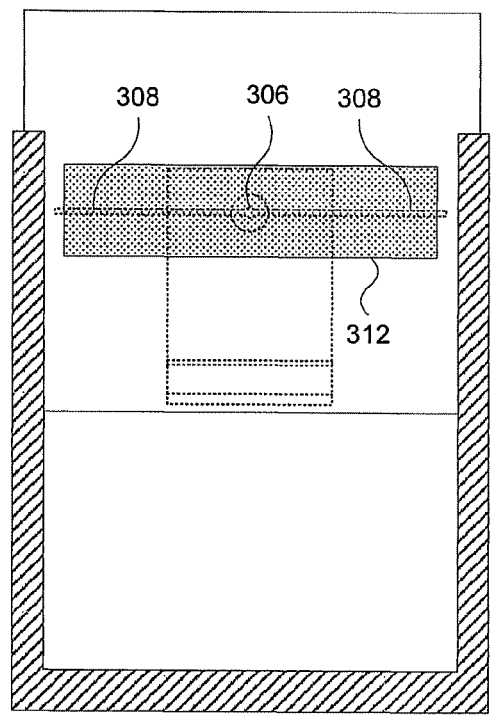
Figure 3A  Figure 3B
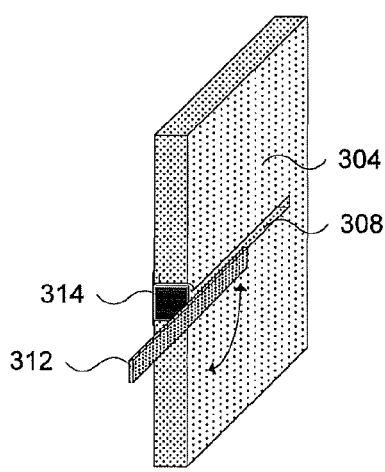
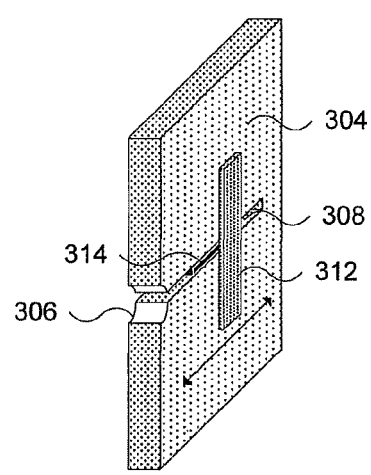
Figure 3C  Figure 3D

HOLSTER FOR A PORTABLE COMMUNICATION DEVICE

TECHNICAL FIELD

The present disclosure relates generally to portable devices and in particular to holsters for portable devices.

BACKGROUND

Portable devices have become common. Users often carry one or more portable devices, including for example cell phones, media players and other portable communication, media and/or entertainment devices. The portable devices generally have a display screen and keyboard or keypad on a front surface of the portable devices. Portable devices do not require the keypads or keyboards on the front surface, which may be comprised substantially of a display screen. The display screen, as well as the front surface more generally, can become dirty from use, especially if the display screen is a touch screen.

Often users use a holster to carry the portable devices around. The holster may include a belt clip for carrying the portable device on a user's clothing. The holster may include an interior lining for preventing scratches on the surface of the portable devices. Other holsters can include soft cloth pouches or solid pouches or similar pockets.

Although holsters may have soft linings, or be fabricated from a similar cloth material, they are do not provide a way to conveniently clean the screen of the portable device.

BRIEF DESCRIPTION OF THE DRAWINGS

A holster is described with reference to the drawings, in which:

FIG. 3A is a side view of a further illustrative holster;
FIG. 3B is a side view of the further illustrative holster of FIG. 3A;
FIG. 3C is an isometric view of detail of the further illustrative holster of FIG. 3A;
FIG. 3D is an isometric view of detail of the further illustrative holster of FIG. 3A.

DETAILED DESCRIPTION

There is provided a holster for a portable device, The holster comprises a housing comprising a support member comprising an interior and exterior surface; and a retaining means for retaining said portable communication device adjacent at least a portion of said interior surface. The holster further comprises a cleaning mechanism comprising a cleaning head movably coupled to the housing and positioned adjacent the interior surface; and an actuator coupled to the cleaning head and positioned on an exterior portion of the holster.

Previous holsters for portable electronic devices have not included a means for cleaning the screen of the device. Various embodiments of holsters are described herein that include means for cleaning the screen, device surface, or portion thereof. As described further with reference to the various embodiments described herein, the cleaning mechanism includes a cleaning head that is attached to an actuator. The actuator may be moved in order to cause the cleaning head to move against the screen or device surface in order to remove dirt, oils, finger prints, etc.

Figures 1A, 1B:
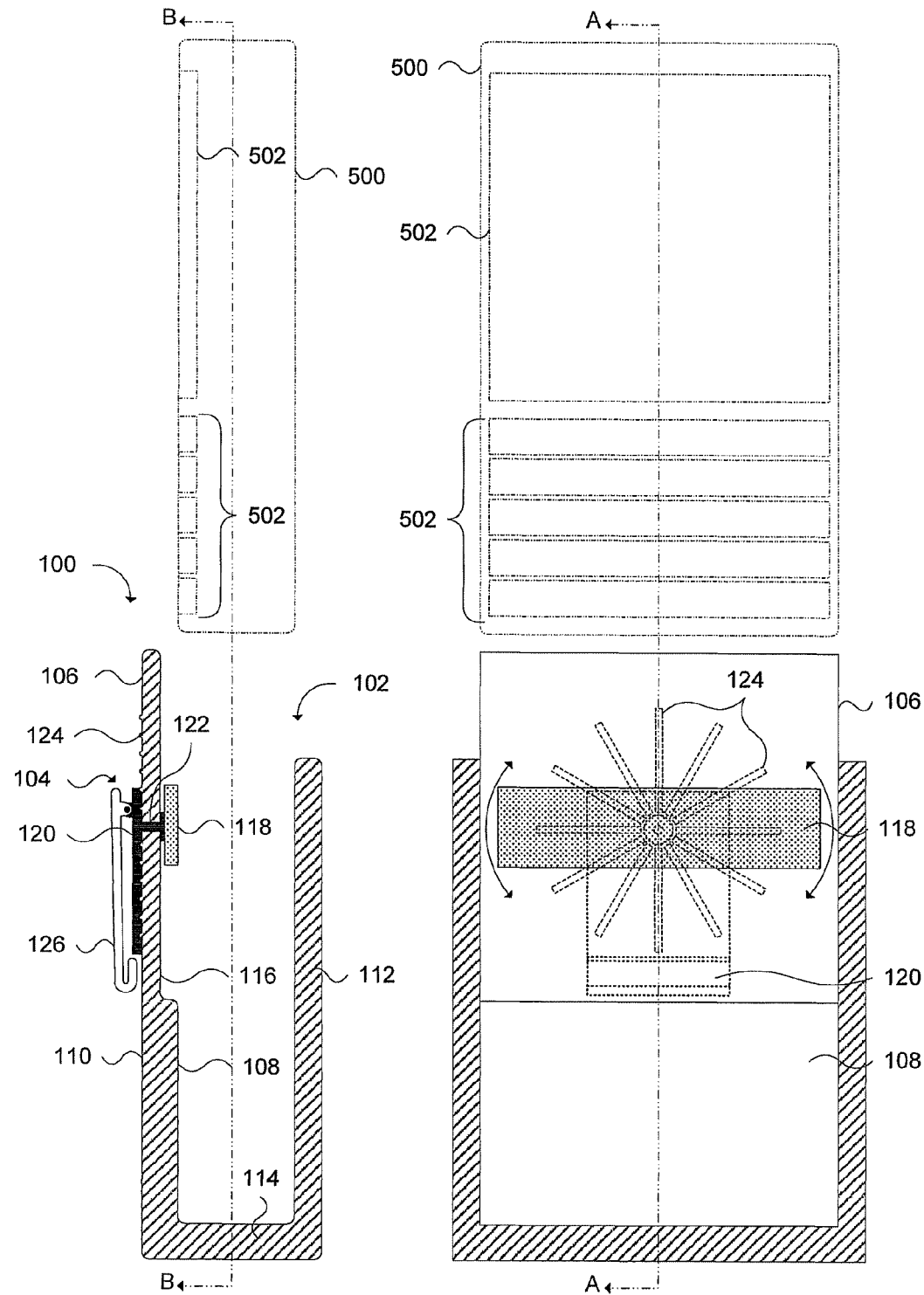
FIG. 1A is a side view of an illustrative holster.
FIG. 1B is a front view of the illustrative holster of FIG. 1A.

FIGS. 1A and 1B depict a side view and front view of a schematic of an illustrative holster. The holster 100 comprises a housing 102 for retaining a portable electronic device 500 and a cleaning mechanism 104. The cleaning mechanism 104 may be used to clean a portion of the portable electronic device 500 when it is seated in the holster 102. As depicted in FIGS. 1A and 1B, the portable electronic device, or simply device, 500 may comprise a screen 502 on a front portion of the device 500 as well as a keypad or keyboard 504. The holster as described herein may also be advantageously used to clean portable devices with varying layouts, such as with only a screen.

The housing 102 comprises a support member 106 that has an interior surface 108 and an exterior surface 110 and a retaining means for retaining the device 500 within the holster 100. The retaining means may include a retaining member 112 that comprises a member substantially parallel to the support member 106 and coupled to the support member 106 by a connecting web 114. The support member 106, connecting web 114 and retaining member 112 may define a space or pocket that the device may be retained in. The interior surface of the housing may include a recessed portion 116. The recessed portion 116 may provide room for the cleaning mechanism to move within the housing 102. When the recessed portion 116 is present, the device 500 may sit in the holster and have a portion of the device 500, such as the keypad or keyboard 504 rest against the interior portion 108 and have another portion of the device 500 rest against the cleaning mechanism 104.

The cleaning mechanism 104 comprises a cleaning head 118 that is rotatably coupled to the support member 106 adjacent the interior surface 108. An actuator 120 is coupled to the cleaning head 118 adjacent to the exterior surface 110. The actuator 120 provides a way of rotating the cleaning head 118 within the holster. The actuator 120 may be connected to the cleaning head 118 by an attachment 122 passing through an aperture in the support member 106. The actuator 120 and the coupled cleaning head may be rotated about the attachment 122 passing through the aperture as indicated by the arrows of FIG. 1B The aperture may be annular in shape and sized to allow the attachment 122 to rotate within the aperture. The attachment 122 may be secured on either side of the support member 106 by the cleaning head, or a portion of the attachment 122 that extends around the aperture on the interior surface 108 and the actuator that extends around the aperture on the exterior surface 110. In order to resist rotation of the cleaning mechanism 104, the aperture and/or the attachment 122 may be sized to have a friction fit.

Additionally or alternatively, the exterior surface 110 may include a biasing means to resist rotation or movement of the cleaning mechanism 104. The biasing mechanism may include a plurality of bumps 124 that extend radially about the aperture. The bumps 124 co-operate with indents in the actuator to provide a force that resists rotation of the actuator 120 The actuator 120 may comprise a belt clip 126. The belt clip 126 may be attached to the actuator 120 or may form the actuator 120.

Figure 2A:
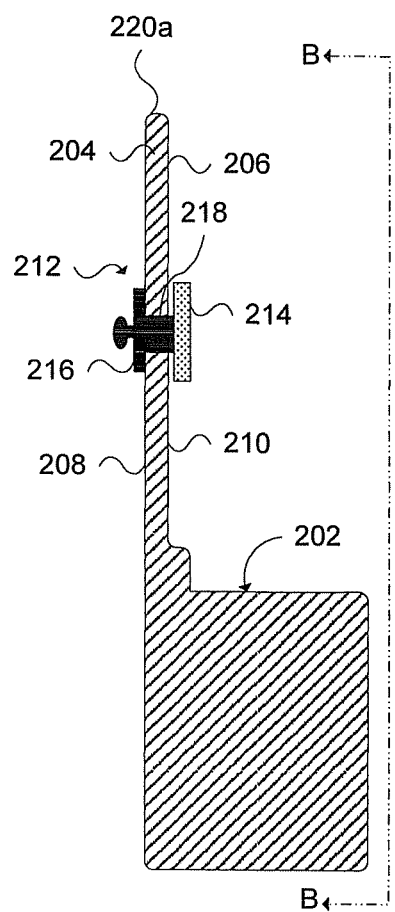
FIG. 2A is a side view of a further illustrative holster.
Figure 2B:
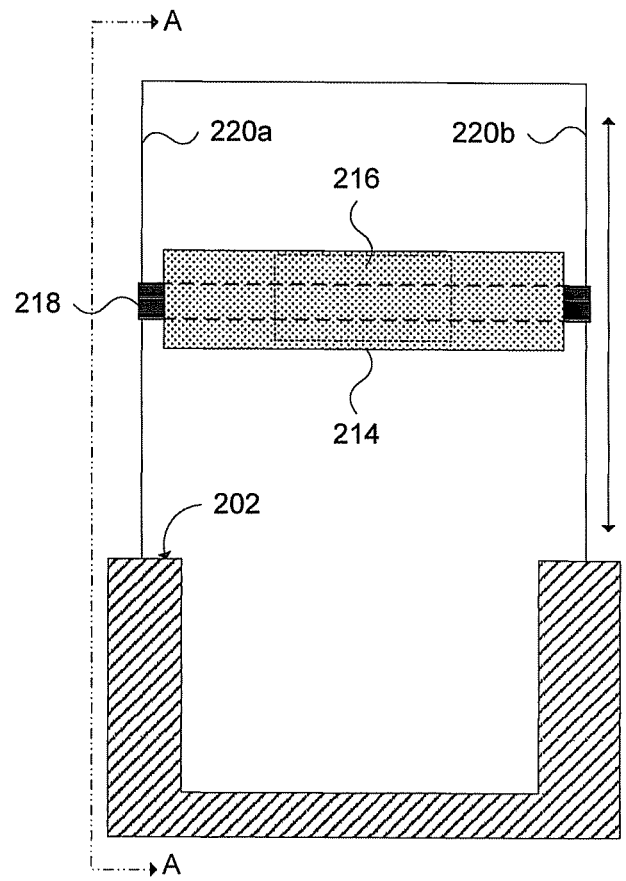
FIG. 2B is a side view of the further illustrative holster of FIG. 2A.

FIGS. 2A and 2B depict a side view and front view of a schematic of a further illustrative holster. The holster 200 includes a cleaning mechanism 212 for cleaning a portion of a surface of a device (not shown) that is seated in the holster 200. The holster 200 is similar to the holster 100; however, the retaining means and the cleaning mechanism differ.

The retaining means comprises a plurality of interior surfaces 202 that provide a frictional fit with the device to retain the device in the holster 200. Although the retaining means of holster 200 differs from the retaining means of holster 100, the retaining means still retains the device adjacent to at least a portion of the support member 106. Similar to the holster 100, the support member 204 of FIGS. 2A and 2B includes an interior surface 206 and an exterior surface 208 and may include a recessed portion 210.

The cleaning mechanism 212 comprises a cleaning head 214 similar to the cleaning head 118 of holster 100. However, unlike the cleaning head 118 of holster, which is rotatably coupled to the support member 106, the cleaning head 214 is slidably coupled to the support member 204 adjacent the interior surface 206. An actuator 216 is coupled to the cleaning head 214 to allow the cleaning head 214 to be slid up and down the support member in order to clean a surface, or portion thereof, of the device when it is in the holster 200.

The actuator 216 may be attached to the cleaning head 214 by an attachment 218 that surrounds both external sides 220a, 220b of the support member 206. Although not depicted in FIG. 2A or 2B the support member 206 may include upper and lower stops in order to limit the movement of the cleaning mechanism 212. The attachment 218 may provide a frictional fit with the support member, in order to resist movement of the cleaning mechanism 212. The actuator 216 can move the cleaning head up and down as depicted by the arrow in FIG. 2B.

FIGS. 3A and 3B depict a side view and front view of a schematic of a still further illustrative holster. The holster 300 includes a housing 302 that is similar to the housing 102; however, the support member 304 of the housing 302 includes an annular aperture 306 similar to the aperture described with regards to FIGS. 1A and 1B. The support member 304 further includes two narrow elongated apertures 308 on either side of the annular aperture 306. The holster 300 with the annular aperture 306 and the elongated apertures 308 allows the cleaning mechanism 310 to both rotate and slide. Similar to the holster 100, the holster 300 includes a cleaning head 312 coupled to the support member 304 adjacent the interior surface of the support member 304. An actuator 314 is coupled to the cleaning head 312 by an attachment 316 that passes through the apertures 306, 308. As described with reference to FIGS. 1A, 1B the actuator 314 adjacent the exterior surface and a portion of the attachment 316 or cleaning head 312 that extends over the annular aperture 306 may retain the attachment 314, as well as the actuator 314 and cleaning head 312, in position within the holster 300

FIGS. 3C and 3D depict details of a portion of the holster 300. As seen in FIGS. 3C and 3D, the attachment 314 comprises a rectangular member that is sized to rotate within the annular aperture 306. When the rectangular member is rotated to be positioned vertically within the annular aperture 306, as depicted in FIG. 3C, it is not possible to slide the cleaning head horizontally across the support member 304. However, when the rectangular member is rotated to be positioned horizontally within the annular aperture 306, it is possible to slide the attachment within the adjoining elongated aperture 308 such that the cleaning head is slid from side to side as depicted by the arrow of FIG. 3D. A although the elongated apertures 308 are described as being positioned horizontally with respect to the holster 300, they may also be advantageously positioned vertically.

Figures 4A, 4B:
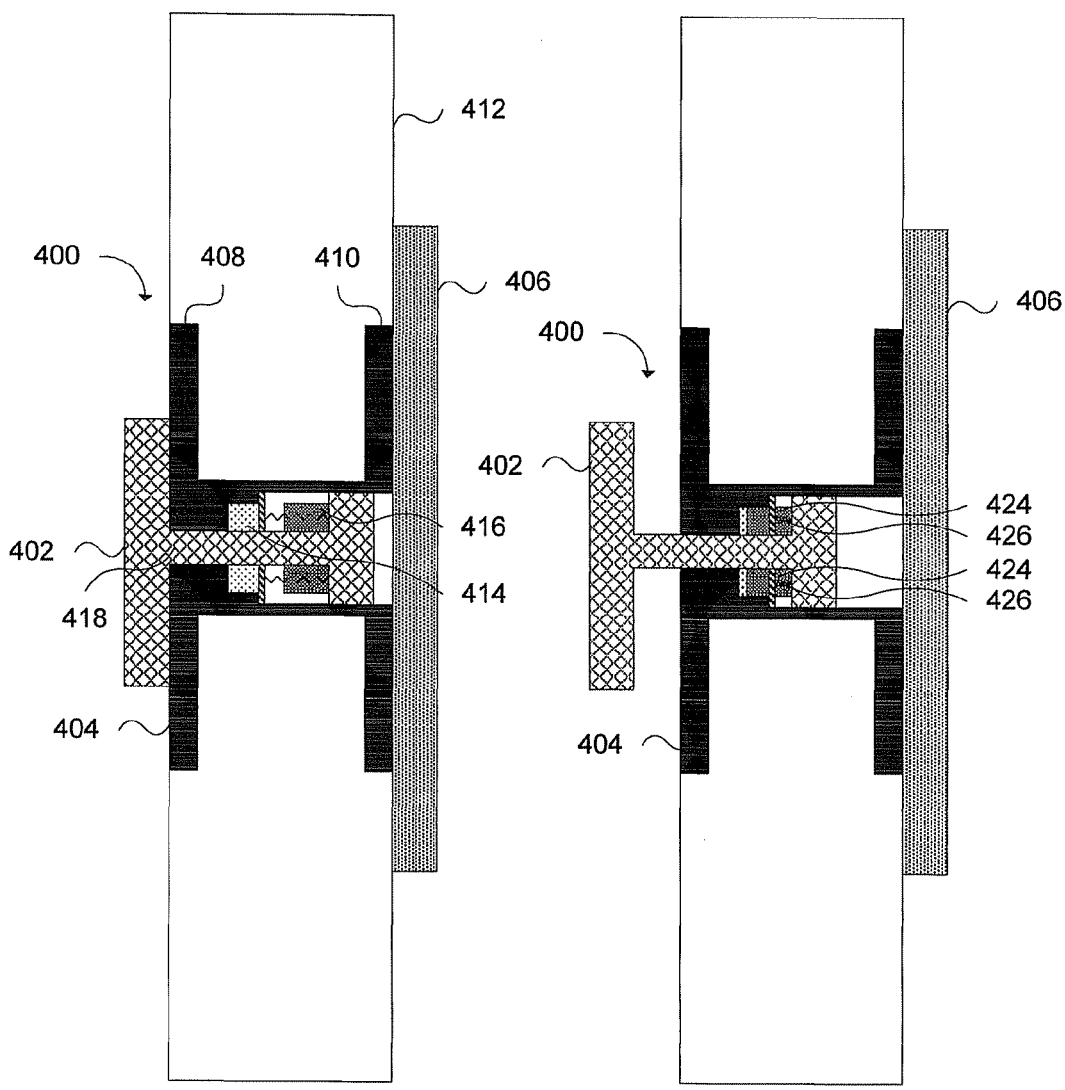
FIG. 4A is a side view of detail of a cleaning mechanism of an illustrative holster.
FIG. 4B is a side view of detail of a cleaning mechanism of an illustrative holster.

FIGS. 4A and 4B depict in a side view detail of a schematic of a cleaning mechanism 400. The cleaning mechanism 400 is similar to the rotatable cleaning mechanism of FIGS. 1A and 1B; however, the cleaning mechanism 400 comprises an actuator 402 that is disengagable from the cleaning head, so that only if the actuator 402 is engaged with an attachment 404 to the cleaning head 406 will rotation of the actuator 402 result in rotation of the cleaning head 406.

The attachment 404 includes two extended annular surfaces 408, 410 on either side of an aperture passing through a support member 412. The extended annular surfaces 408, 410 may be recessed to be flush with the interior and exterior surfaces. That attachment 404 includes an annular passage of a reduced size positioned on an exterior side of the attachment 404 and a larger sized annular passage passing through a portion of the attachment 404. The reduced size annular passage and the larger sized annular passage are arranged within the attachment 404 such that they provide a stepped arrangement with the, reduced sized annular passage located adjacent the exterior surface. The attachment 404 may rotate within the aperture of the support member 402. The cleaning head 406 may be attached to the attachment 404. In addition to the stepped aperture, the attachment includes a slot 414 for receiving a corresponding key 416 of an actuator 402. When the key 416 is received within the slot 414, the actuator 402 engages with the attachment 404 so that rotation of actuator 402 causes the attachment 404 as well as the cleaning head 406 to rotate.

The actuator 402 comprises a stepped annular member 418 that includes a reduced sized annular member 420 sized to pass through the reduced size annular passage of the attachment 404. The attachment 404 includes an enlarged annular member 422 attached to the reduced sized annular member 420. The enlarged annular member 422 is sized to fit within the larger sized annular passage of the attachment 404. The actuator 402 includes a key 416 attached to the stepped annular member 418 that fit within the slot 414 of the attachment 404.

Figure 4C:
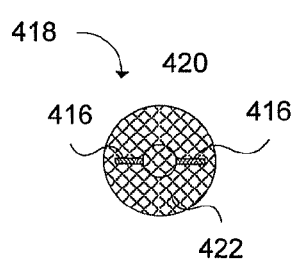
FIG. 4C is a top view of detail of an attachment of the cleaning mechanism of FIG. 4A.
Figure 4D:
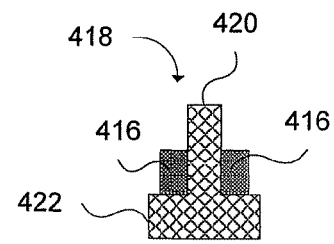
FIG. 4D is a side view of detail of an attachment of the cleaning mechanism of FIG. 4A.

FIGS. 4C and 4D depict a top view and side view of a portion of the stepped annular member 418, that includes the reduced size annular member 420 and the enlarged annular member 422. The stepped annular member 418 further includes the key 416 to engage with the corresponding slot 414 of the attachment 404.

As depicted in FIGS. 4A and 4B, the actuator 402 may also include a biasing plate 424 and biasing means 426. The biasing plate 424 and the biasing means 426 provide a biasing force tin order to return the actuator 402 to the disengaged position. In order to engage the actuator 402 with the attachment 404, a handle 428, or similar means, attached to the stepped annular member 418 of the actuator 402 is withdrawn so that the biasing means 426 are compressed, and the key 416 of the actuator 402 engage the slot 414 of the attachment 404.

Various embodiments of a holster for a portable electronic device that includes a cleaning mechanism for cleaning a surface of the portable electronic device have been described. The cleaning head of the various devices may comprise various materials, including cloth fabric, microfiber materials, plastics, rubbers or combinations of these. Additionally, the cleaning heads of the various embodiments described herein may be removable in order to facilitate replacement.

Furthermore, although not depicted in the figures, the various holsters described herein may further include a liquid dispensing component for dispensing a liquid, for example a cleaning fluid, onto the cleaning head, or directly onto the surface of portable electronic device. The liquid dispensing component may include a separate dispensing activator in order to dispense the liquid when desired. Alternatively, the dispensing activator may be activated by the actuator of the holster.

Furthermore, although certain aspects of the holster have been described in relation to one or more of the illustrative embodiments, different aspects of each embodiment may be applied to other illustrative embodiments. For example, the biasing means described with regards to FIGS. 1A and 1B may be included in the other illustrative embodiments.

What is claimed is:

1. A holster for a portable electronic device having a display screen, the holster comprising:
    a housing comprising:
        a back portion of the housing defined by a support member comprising an interior and exterior surface; and
        a retaining means for retaining said portable electronic device adjacent at least a portion of said interior surface of the back portion of the housing, the retaining means comprising:
        at least one retaining surface substantially parallel to the interior surface of the back portion of the housing: and
        at least one connecting web connecting the at least one retaining surface to the back portion of the housing, the at least one connecting web maintaining the at least one retaining surface in a non-moving and substantially parallel arrangement relative to the back portion,
        wherein the housing is elongated in a longitudinal direction and has an upper section in the longitudinal direction for slidably receiving said portable electronic device between the interior surface of the support member and the at least one retaining surface; and
    a cleaning mechanism comprising:
        a cleaning head movably coupled to the back portion of the housing and positioned adjacent the interior surface, wherein at least a portion of said display screen of said portable electronic device passes over the cleaning head when slidably received within the housing; and
        an actuator coupled to the cleaning head and positioned on an exterior portion of the back portion of the housing of the holster.

2. The holster as claimed in claim 1, wherein the support member comprises an aperture in the exterior surface and the interior surface, the actuator coupled to the cleaning head by an attachment passing through the aperture.

3. The holster as claimed in claim 2, wherein the aperture is circular and the cleaning head is rotatably coupled to the housing.

4. The holster as claimed in claim 2, wherein the aperture is elongated substantially perpendicular to the longitudinal direction of the housing and the cleaning head is slidably coupled to the housing.

5. The holster as claimed in claim 2, wherein the aperture is elongated substantially parallel to the longitudinal direction of the housing and the cleaning head is slidably coupled to the housing.

6. The holster as claimed in claim 1, wherein the cleaning head is slidably coupled to the support member through an attachment to the actuator, the attachment to the actuator comprising a web surrounding opposite sides of the support member.

7. The holster as claimed in claim 1, wherein the actuator is disengagably coupled to the cleaning head.

8. The holster as claimed in claim 1, further comprising a biasing means coupled to the cleaning mechanism, the biasing means resisting movement of the cleaning mechanism.

9. The holster as claimed in claim 1, further comprising:
    a belt clip attached to the actuator.

10. The holster as claimed in claim 1, wherein the retaining means further comprises:
    one or more interior surfaces frictionally engagable with said portable electronic device.

11. The holster as claimed in claim 1, wherein the cleaning head comprises at least one of:
    a cloth material;
    a microfibre material;
    a plastic material; or
    a rubber material.

12. The holster as claimed in claim 1, wherein the cleaning head is detachable from the cleaning mechanism.

13. The holster as claimed in claim 1, further comprising a liquid dispenser for dispensing a liquid.

14. The holster as claimed in claim 13, wherein the liquid dispenser dispenses a portion of said liquid onto the cleaning head or onto a surface of said portable electronic device when inserted into the holster.

15. The holster as claimed in claim 13, wherein the liquid dispenser comprises a release mechanism for causing a portion of said liquid to be dispensed.

16. The holster as claimed in claim 15, wherein the release mechanism is activated by movement of the actuator of the cleaning mechanism.

17. The holster as claimed in claim 15, wherein the release mechanism is activated separately from movement of the actuator of the cleaning mechanism.

* * * * *